J. DUDASH.
PUZZLE.
APPLICATION FILED MAY 11, 1920.
1,356,610.
Patented Oct. 26, 1920.
2 SHEETS—SHEET 1.
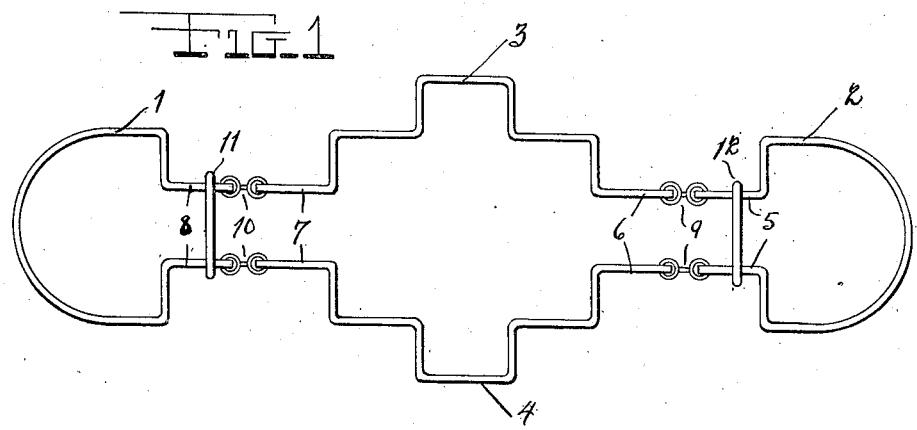
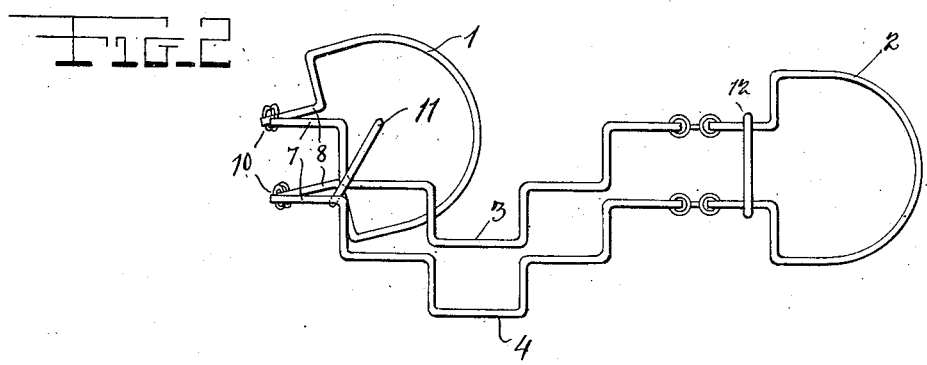
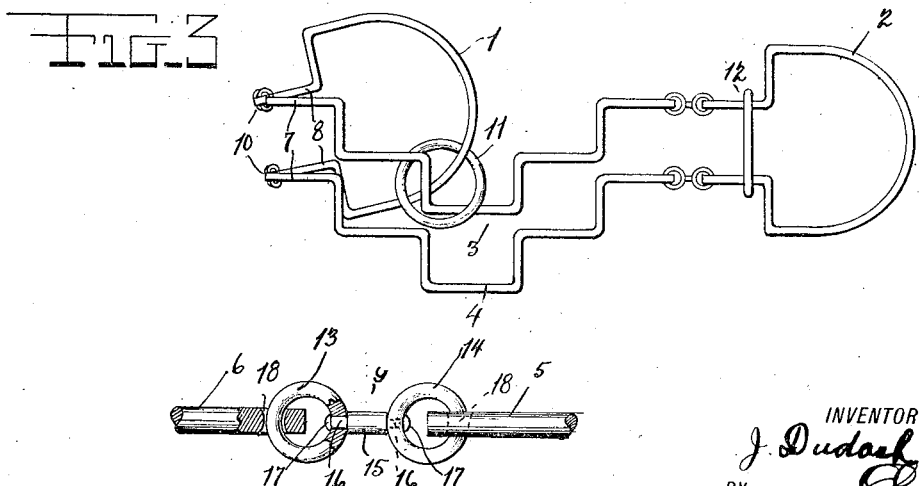
INVENTOR
J. Dudash
BY
his ⟨signature⟩
ATTORNEY

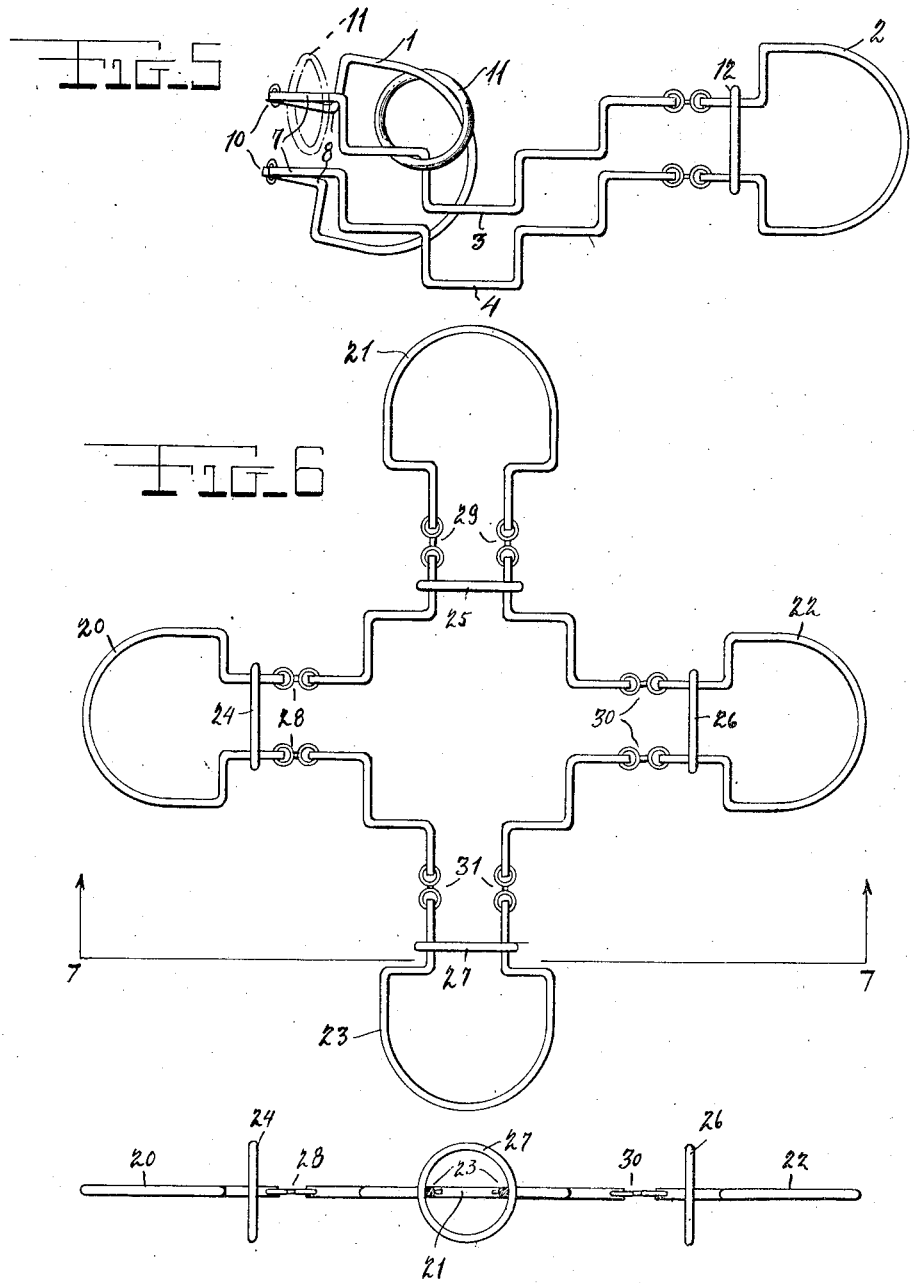

UNITED STATES PATENT OFFICE.

JACOB DUDASH, OF ROCKVILLE, CONNECTICUT.

PUZZLE.

1,356,610.  Specification of Letters Patent.  Patented Oct. 26, 1920.

Application filed May 11, 1920. Serial No. 380,538.

*To all whom it may concern:*

Be it known that I, JACOB DUDASH, a citizen of Poland, and resident of Rockville, in the county of Tolland and State of Connecticut, have invented certain new and useful Improvements in Puzzles, of which the following is a specification.

This invention relates to puzzles, and has for its main object the provision of such a device which is entertaining and amusing in its apparent intricacy, and which is yet simple and easy in proper manipulation.

The above and other objects will become apparent in the description below, in which characters of reference refer to like-named parts in the drawings.

Referring briefly to the drawings, Figure 1 is a view of my device ready for manipulation in order to remove the rings 11 and 12 therefrom.

Figs. 2 and 3 show the device with one of said rings in successively advanced stages of manipulation in removing the same from the device.

Fig. 4 is a view showing my peculiar pivot construction.

Fig. 5 is a view of my device showing the said ring in its last stages on the way to removal.

Fig. 6 is a view of a modified form of my device.

Fig. 7 is a view taken on the line 7—7 of Fig. 6.

Referring now in detail to the drawings, the numerals 1 and 2 represent the end members of my device, and 3 and 4 the central members; the legs of the said members are indicated at 5, 6, 7, and 8. The said parts are joined as shown at 9 and 10 to form a completely closed device. The material comprising the said parts is preferably steel wire or the like. Rings 11 and 12 are adapted to be removed from the device, or replaced thereon, without opening the device at any joint, but merely by manipulating the same in the following described manner.

It is believed that few words of description are necessary in order to further clarify the manner of said manipulation in view of the disclosure in Figs. 1, 2, 3, and 4. Referring to the ring 11, in its removal the member 1 is first turned back against the members 3 and 4, and the member 3 is turned through 180 degrees into the position shown in Fig. 2. The ring 11 is then passed along the member 3 and one leg of the member 1, both of which it encircles. The ring is thus farther advanced until it reaches the position shown in Fig. 3, whence the member 1 is drawn to the right so that the ring 11 may be passed back again along the other leg of the member 1 and the same member 3. This is shown in Fig. 5, and the ring in its final position before leaving the device is shown dotted.

The manner of replacing the ring upon the device is, obviously, the reverse of that just described for its removal. The ring 12 may in the same manner be removed or replaced.

In the modification shown in Fig. 6, I have provided four members similar to the members 1 and 2, indicated at 20, 21, 22, and 23, joined to the central members by joints 28, 29, 30, and 31, containing four rings 24, 25, 26, 27.

Referring now to Fig. 4, in which the joint 9 is shown in detail (all the other joints or pivots are similar to that at 9), the same comprises a pair of small rings 13 and 14 joined by a member 15 having reduced ends 16 inserted in said rings. Heads 7 are provided on said ends 16 to retain the same in the rings 14. The leg 5 of the member 2 contains a recess 18 through which the ring 14 passes; similarly the leg 6 of the member 3 contains a recess 18 for the passage of the ring 13.

Thus it is apparent that I have provided flexible joints which allow turning of the respective parts of the device in almost any direction relative to the other parts; this is necessary in order to allow manipulation of the device as above explained.

I claim:

A puzzle comprising a pair of end members, a pair of central members, said end and central members joined to form a completely closed device, the inner ends of said end members being of a lesser width than the greatest width of said end members, rings adapted to be placed on or removed from said device, said rings being of a lesser diameter than said greatest width, joints between said end and central members comprising a pair of eyelets, a member having reduced ends joining said eyelets, recesses in the legs of said aforementioned end and central members, said recesses receiving said eyelets.

Signed at Rockville, in the county of Tolland and State of Connecticut, this first day of May, A. D. 1920.

JACOB DUDASH.